United States Patent [19]

Horstman

[11] Patent Number: 4,742,761

[45] Date of Patent: May 10, 1988

[54] METHOD AND APPARATUS FOR CONTROLLING THE CONCENTRATION OF CARBON DIOXIDE IN AN AIRCRAFT CABIN

[75] Inventor: Raymond H. Horstman, Auburn, Wash.

[73] Assignee: The Boeing Company, Seattle, Wash.

[21] Appl. No.: 75,555

[22] Filed: Jul. 20, 1987

[51] Int. Cl.[4] ............................................. B64D 13/04
[52] U.S. Cl. ........................................ 98/1.5; 98/34.5; 128/205.26
[58] Field of Search ...................... 98/1.5, 2.15, 5, 10, 98/34.5, 34.6; 128/1 B, 205.12, 205.26; 137/81.1; 244/118.5; 165/15

[56] References Cited

U.S. PATENT DOCUMENTS

| | | | |
|---|---|---|---|
| Re 23,913 | 12/1954 | Baak | 98/1.5 |
| 1,779,160 | 10/1930 | Diehl | 98/1.5 X |
| 1,985,050 | 12/1934 | Merle | 98/1.5 X |
| 2,181,199 | 11/1939 | Otterson | 98/1.5 X |
| 2,232,587 | 2/1941 | Brandt | 98/10 X |
| 2,234,037 | 3/1941 | Anderson | 422/110 X |
| 2,316,237 | 4/1943 | Grunert et al. | 55/385 A |
| 2,496,862 | 2/1950 | Del Mar | 98/1.5 |
| 3,144,317 | 8/1964 | Arnoldi | 98/1.5 X |
| 3,242,058 | 3/1966 | Ganley et al. | 244/1 X |
| 3,274,751 | 9/1966 | Skarstrom | 128/205.28 X |
| 3,403,612 | 10/1968 | Swet et al. | 128/205.28 X |
| 3,410,191 | 11/1968 | Jackson | 98/1.5 |
| 3,469,934 | 9/1969 | Bocard et al. | 423/220 |
| 3,497,312 | 2/1970 | Zeff et al. | 428/205.28 |
| 3,772,851 | 11/1973 | Duffey | 55/18 |
| 4,164,901 | 8/1979 | Everett | 98/36 X |
| 4,407,185 | 10/1983 | Haines et al. | 98/1.5 |
| 4,419,926 | 12/1983 | Cronin et al. | 98/1.5 |
| 4,462,561 | 7/1984 | Cronin | 98/1.5 X |
| 4,523,517 | 6/1985 | Cronin | 98/1.5 |
| 4,530,272 | 7/1985 | Stokes | 98/34.5 |

FOREIGN PATENT DOCUMENTS 544227 6/1940 United Kingdom ................... 98/1.5

Primary Examiner—Harold Joyce
Attorney, Agent, or Firm—Christensen, O'Connor, Johnson & Kindness

[57] ABSTRACT

A control and method for maintaining the concentration of carbon dioxide in the cabin (11) of an aircraft at a desired level. A carbon dioxide sensor (40, 41) is disposed to monitor the concentration of carbon dioxide in the cabin of the aircraft. Air drawn from the cabin at locations (24, 25) where the concentration of carbon dioxide is relatively higher than at other locations (31, 32) is selectively vented overboard or recirculated in response to the concentration of carbon dioxide in the cabin. As more air is vented overboard to maintain the cabin at a desired level of carbon dioxide concentration, an air pack compensates by supplying additional pressurized fresh air to the cabin. Should the cabin pressure drop below a minimum set point limit, the control causes less air to be vented overboard, irrespective of the carbon dioxide concentration. In another embodiment, cabin pressure is controlled between predetermined limits, and so long as the pressure remains between those limits, additional pressurized fresh air is provided if the level of carbon dioxide increases beyond a predetermined limit.

22 Claims, 3 Drawing Sheets

METHOD AND APPARATUS FOR CONTROLLING THE CONCENTRATION OF CARBON DIOXIDE IN AN AIRCRAFT CABIN

TECHNICAL FIELD

This invention generally relates to ventilation systems for pressurized enclosed spaces, and more particularly to a system for providing an aircraft ventilation system responsive to carbon dioxide concentration.

BACKGROUND ART

Passenger aircraft designed to fly at altitudes in excess of 10,000 feet are generally required to have sealed cabins supplied with pressurized, temperature conditioned air. Although a substantial portion of the supply air is drawn from the cabin and recirculated, at least some fresh air from outside the cabin must be pressurized and mixed with the recirculated air to make up for leakage and to provide adequate ventilation for the cabin. The apparatus responsible for pressurizing and temperature conditioning fresh supply air is referred to in the aircraft industry as an "air pack."

An air pack uses a compressor for pressurizing the relatively low density air at high altitudes. Typically, the compressor is powered by jet engine bleed air, using an air turbine drive. Since use of engine bleed air for this purpose reduces the operating efficiency of an aircraft, it is desirable to minimize the volume of low density fresh air that the air pack must pressurize or supply to the cabin space. However, it should be apparent that at least some of the cabin air *must* be vented overboard to avoid the build up of carbon dioxide and other contaminants that result principally from the metabolic activity of the passengers in the aircraft.

Exacerbating the ventilation problem is the contamination produced by cigarette smoke. Although cigarette smoking passengers are generally seated in a limited "smoking area" of the aircraft, there is a growing conceern about the rights of non-smoking airline passengers to breathe air free of cigarette smoke and its associated carcinogenic contaminants. A conventional aircraft ventilation system may be set up to exhaust or vent a fixed percentage of the total return air overboard; however, such systems do not provide means to insure that adequate fresh air is being supplied to properly ventilate the cabin, nor means to avoid venting too much air drawn from the cabin. If too little air is vented overboard and thus too little fresh air is supplied as makeup, the cabin air will eventually become stale and unhealthy. Conversely, if too much air is vented, the system must use excessive engine bleed air to run the air pack compressor, in order to supply pressurized fresh air for maintenance of the cabin pressure within the desired limits.

The prior art ventilation systems used on aircraft have generally only permitted manual control of the amount of air vented from the aircraft. Such systems have not provided means for automatically determining whether more or less cabin air should be vented overboard rather than being recirculated. While maintenance of a comfortable and healthy environment in the aircraft cabin undoubtedly has a higher priority, it is also important to minimize the operating costs of an aircraft. Prior art ventilation systems for aircraft have simply relied upon the subjective evaluation of the flight crew to control the amount of fresh air supplied to the cabin and thus often may fail either to provide proper ventilation or to operate at optimum efficiency.

SUMMARY OF THE INVENTION

The present invention is used in a system that maintains a pressurized enclosed space (e.g., an aircraft cabin) at a desired air pressure. Included in the system are means for recirculating back into the enclosed space air drawn from a plurality of locations, and means for supplying pressurized air that is a mixture of fresh air and recirculated air to the enclosed space to maintain it at a desired pressure. The invention is an apparatus and method for selectively recirculating or venting air drawn from one or more locations in the enclosed space where the air is relatively higher in carbon dioxide concentration than air drawn from one or more other locations.

The apparatus includes means for sensing carbon dioxide and producing a signal indicative of the concentration thereof in the enclosed space. Connected to receive the signal and responsive to it are, in one embodiment, means for controlling the volume of air drawn from the one or more locations where the air is relatively higher in carbon dioxide concentration, that is vented from the space rather than recirculated, as a function of the concentration of carbon dioxide in the space.

As more air from the one or more locations having a relatively higher concentration of carbon dioxide is vented, the means for supplying pressurized air respond by supplying relatively more fresh pressurized air to maintain the enclosed space at a desired pressure. However, should the pressure in the space fall below a preset level, the means for venting air that is relatively higher in concentration of carbon dioxide are operative to vent less air from the space, irrespective of the carbon dioxide concentration.

In another embodiment, the volume of pressurized fresh air supplied to the space is increased if the concentration of carbon dioxide exceeds a predetermined level. However, pressure control means give priority to the maintenance of cabin pressure, irrespective of the concentration of carbon dioxide.

It will be apparent that the present invention operates to automatically maintain the enclosed space at a desired air pressure while at the same time maintaining the concentration of carbon dioxide in the space at an acceptable level. The present invention accomplishes this object by venting only air that is relatively higher in carbon dioxide, while recirculating air that is lower in carbon dioxide concentration. Thus the environmental quality of the air in the enclosed space is maintained at a desirable level, but only the minimum air necessary to accomplish this object is vented from the space.

As applied to the ventilation system of an aircraft, the present invention provides the above-noted benefit, yet improves overall system operating efficiency. Unnecessary use of engine bleed air to power the air pack compressor is reduced, without degradation of cabin air quality.

These and other advantages of the present invention will become apparent from the attached drawings and the description of the preferred embodiments that follows hereinbelow.

DESCRIPTION OF THE PREFERRED EMBODIMENTS

Figure 1:
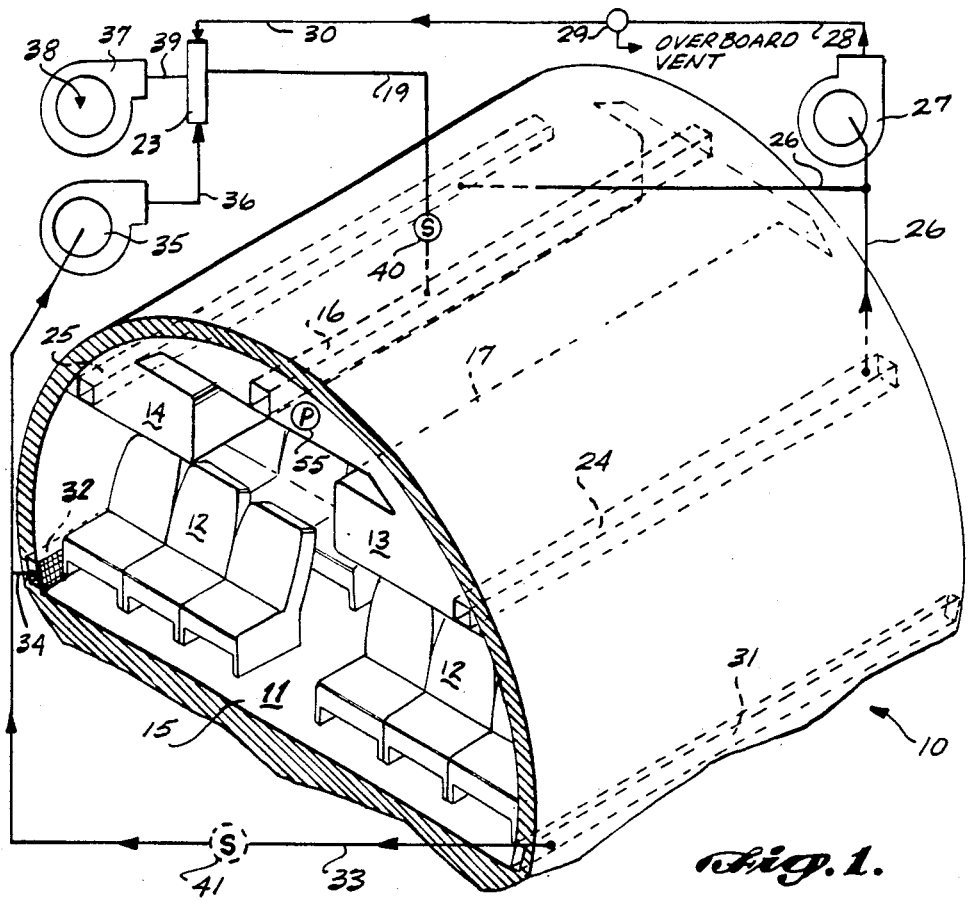
FIG. 1 is a cutaway perspective view of an aircraft cabin showing schematically a ventilation and cabin pressurization system that includes the present invention.

With reference to FIG. 1, a section of an aircraft fuselage is shown, generally denoted by reference numeral 10. A cabin 11 within fuselage 10 includes a seating area 12 having three abreast seating for passengers on each side of a center aisle. Above seating area 12 is disposed an overhead storage bin 13 on the left side of fuselage 10, and an overhead storage bin 14 on the right side thereof (left and right referencing the sides of fuselage 10 relative to a passenger seated in cabin 11). The lower portion of cabin 11 is defined by cabin floor 15.

Ventilation air is supplied to passengers in seating area 12 by means of a supply duct 16 that extends parallel to the longitudinal axis of fuselage 10 at the top of cabin 11, generally centered therein and includes a plurality of outlets (not shown) on its lower surface through which air is directed generally downward toward the passenger seating area 12.

The ventilation supply air is distributed to supply duct 16 through supply air line 19. Supply air line 19 is in fluid communication with a mixing manifold 23, which is provided pressurized supply air, as will be described hereinbelow.

Air is drawn from cabin 11 at a number of locations. Two of these locations, exhaust air ducts 24 and 25, extend generally parallel to the longitudinal axis of fuselage 10 and are disposed in a corner of overhead storage bins 13 and 14, generally above seating area 12. Exhaust ducts 24 and 25 are thus operative to provide a flow path for air drawn from cabin 11 through a plurality of openings (not shown) at a location immediately adjacent and above the heads of the passengers normally seated therein, for transmission through exhaust lines 26. One or more fans 27, having their suction inlet connected to lines 26, are operative to pull air from cabin 11 through ducts 24 and 25. The outlet of fan(s) 27 is connected to exhaust/return line 28. Air flowing through line 28 is directed into a three-way valve 29 that is operative to selectively vent the air overboard outside the aircraft, or pass it on to a recirculation line 30. Valve 29 may be an electro-pneumatic type or motor driven, and operative to provide proportional control between two positions, i.e., to vent a portion of the air overboard that is provided through line 28 while recirculating a portion of the air into line 30, the proportion of air thus vented overboard or recirculated being controlled by the valve position. Air that is recirculated through line 30 is directed into mixing manifold 23.

Two other exhaust ducts 31 and 32 extend generally parallel to the longitudinal axis of fuselage 10 and are disposed along the sides thereof adjacent floor 15. Air is drawn from cabin 11 at these locations because they are substantially lower than exhaust ducts 24 and 25 and farther away from the heads of passengers seated in seating area 12. Air drawn from exhaust ducts 31 and 32 passes respectively into recirculation lines 33 and 34, that are connected to the suction inlet of one or more fans 35, which are operative to draw air from the lower portion of cabin 11 through ducts 31 and 32. The outlet of fan(s) 35 is connected to a recirculation line 36 that is in fluid communication with a second inlet to mixing manifold 23.

A third inlet to mixing manifold 23 is provided with pressurized air by an air pack 37. Although represented in FIG. 1 as simply a fan, it will be understood by those skilled in the art that air pack 37 includes a compressor for pressurizing relatively low density fresh air drawn from outside the aircraft at 38, and further includes temperature conditioning means for both heating and cooling such air. The mechanism by which these functions of air pack 37 are accomplished is not shown, simply because it is so well known and understood by those skilled in the art. Pressurized and temperature conditioned air from air pack 37 is provided as an input to mixing manifold 23 through fresh air supply line 39.

Mixing manifold 23 is thus provided air from three sources: (a) air recirculated from exhaust ducts 24 and 25 disposed above the passenger seating area 12; (b) air recirculated from exhaust ducts 31 and 32 disposed near the floor of cabin 11; and (c) fresh air from outside the aircraft, pressurized and temperature conditioned by air pack 37. The air from these three sources is mixed in the same proportion in which it is supplied to mixing manifold 23 and is provided as supply air to cabin 11, as previously explained hereinabove.

Air supplied to cabin 11 passes through a carbon dioxide sensor 40 which, as shown in FIG. 1, is disposed on supply air line 19. It will be understood that carbon dioxide sensor 40 might also be located on other air lines, or within supply duct 16. Disposed in any of these locations, sensor 40 is operative to sense the concentration of carbon dioxide in the supply air.

Alternatively, a carbon dioxide sensor could be located as shown at 41, disposed on recirculation air line 33. For sensing the concentration of carbon dioxide in the return air, it will also be apparent that sensor 41 could be located within exhaust ducts 31 or 32 or on recirculation line 34.

If a carbon dioxide sensor providing a similar function to that of sensors 40 and 41 is located within cabin 11, it should preferably be disposed adjacent floor 15, below seating area 12. The disposition of the carbon dioxide sensor within cabin 11 is important because of the non-homogenous distribution of carbon dioxide. Carbon dioxide exhaled by passengers in seating area 12, and cigarette smoke and other contaminants in the cabin air tend to concentrate at the upper portion of the cabin. It is undesirable to locate the carbon dioxide sensor at this point of higher carbon dioxide concentration, because the sensor would not be exposed to air representative of the average concentration in the cabin. For the same reason, it is preferable that air drawn from these locations of relatively higher concentration of carbon dioxide and other contaminants be selectively exhausted overboard by means of three-way valve 29. Air drawn from a much lower elevation in cabin 11 through ducts 31 and 32 has a relatively low concentration of carbon dioxide and other contaminants, and thus may be recirculated. Sensors 40 and 41 (and any such sensor positioned within cabin 11 as explained above) are each operative to indicate a representative concentration of carbon dioxide in cabin 11. It will be apparent that two or more such sensors might be used for this purpose, and further, that a weighted average of the signals produced by sensors disposed at different locations might be used as a more accurate indication of carbon dioxide concentration in the cabin space.

Figure 2:
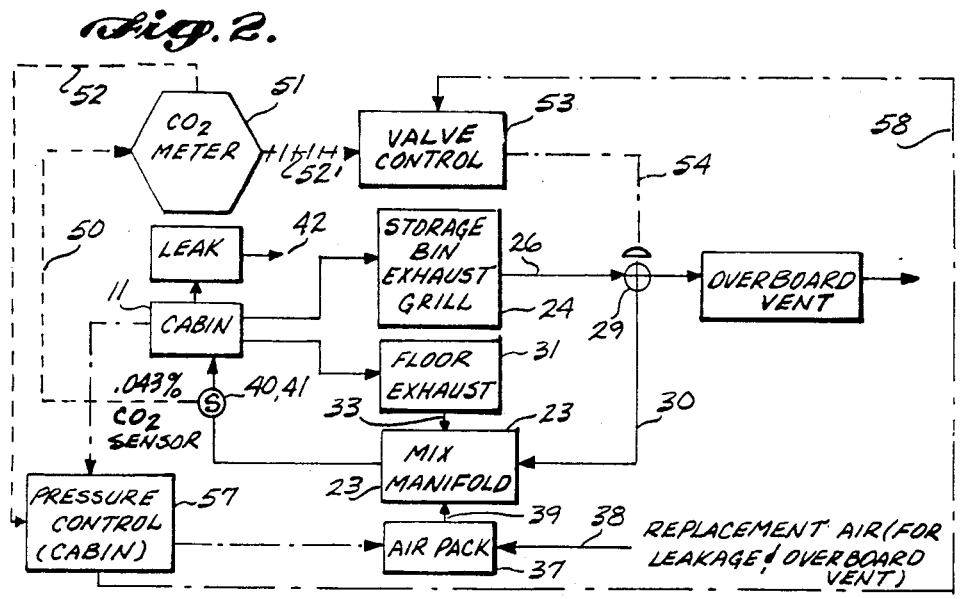
FIG. 2 is a block diagram illustrating the control relationship between the ventilation and cabin pressurization system and the present invention.

Three-way valve 29 is controlled in response to the concentration of carbon dioxide in cabin 11 as shown in FIG. 2. As already explained, carbon dioxide sensor 40 (or 41) senses the concentration of carbon dioxide in air supplied to cabin 11 (or returning therefrom). Sensor 40 (or 41) produces a signal indicative of the relative concentration of carbon dioxide in cabin 11 that is conveyed over conductors 50 to carbon dioxide meter 51. In the preferred embodiment, carbon dioxide meter 51 produces an analog DC signal proportional to the concentration of carbon dioxide in the cabin, having a range from 0 to 5 VDC. A sensor 40 (or 41) and carbon dioxide meter 51 appropriate for use in this application is manufactured by Gas Tech, Inc. (Model 3600). This meter uses an infrared absorption sensor to generate an electrical signal that varies inversely with the carbon dioxide level in a gas being sampled. Other devices producing an output signal that varies in proportion to $CO_2$ concentration might also be used for this purpose.

In a first embodiment of the present invention, the analog signal produced by carbon dioxide meter 51 is input over conductor 52' to a valve controller 53. In response to the analog signal input on line 52', valve controller 53 produces either a pneumatic or an electrical valve control signal (depending on the type valve 29 used) that is carried via line 54 to three-way valve 29, controlling the amount of air that is vented overboard. For example, assume that the maximum concentration of carbon dioxide desired in cabin 11 as measured by sensor 40 is 0.043%. Should the concentration of carbon dioxide exceed that level, valve controller 53 produces a signal that is input over line 54 to three-way valve 29, causing it to vent overboard relatively more air drawn from cabin 11 through exhaust ducts 24 and 25. Conversely, as the concentration of carbon dioxide determined by sensor 40 falls below the desired level, valve controller 53 causes three-way valve 29 to vent less air overboard.

If the carbon dioxide sensor is located at 41, the desirable limit may be set at a relatively higher percentage, for example 0.1%. Valve controller 53 nevertheless functions in the same manner to maintain the concentration of carbon dioxide in the cabin as measured at sensor 41 (or at a location in cabin 11 adjacent floor 15) at the desired 0.1% limit.

As valve controller 53 responds to a carbon dioxide concentration level in excess of the desired limit, causing three-way valve 29 to vent overboard more air drawn from exhaust ducts 24 and 25, the pressure in cabin 11 tends to decrease. A pressure sensor 55 schematically shown in FIG. 1 disposed adjacent the top of cabin 11 provides an input to pressure controller 57 as shown in FIG. 2. Pressure controller 57 responds to the air pressure in cabin 11 as measured by pressure sensor 55 to cause air pack 37 to supply either more or less pressurized fresh air from outside the aircraft. Since there is usually some leakage from the cabin 11 as represented by block 42 in FIG. 2, pressure controller 57 generally requires that at least some make-up fresh air be supplied by air pack 37, regardless of any action taken to vent more air overboard by three-way valve 29. However, in responding to a decreasing cabin air pressure caused by three-way valve 29 venting an increasing amount of air, pressure controller 57 causes air pack 37 to supply a corresponding increased volume of pressurized fresh air to mixing manifold 23, thereby maintaining the cabin pressure at a desired level.

In the event that cabin pressure falls below a preset minimum limit, as might occur should a window or door seal fail, pressure controller 57 produces an override signal that is input to valve controller 53 by means of conductor 58. This override signal causes valve controller 53 to selectively vent less air overboard through valve 29, enabling air pack 37 to increase the air pressure within cabin 11 to an acceptable level.

The functions performed by pressure controller 57 and valve controller 53 can be implemented by a conventional microprocessor control (not shown) provided the control is properly programmed with the appropriate control algorithms. Since the details of typical microprocessor controllers are generally well known to those skilled in the art, it is not necessary to present them herein to provide a full enabling disclosure of the present invention. As is typical of such controls, the microprocessor control should include an analog-to-digital conversion capability so that analog signals from pressure sensor 55 and from carbon dioxide sensor 40 (41) can be converted to a digital signal that the microprocessor may use as input. Likewise, control of air pack 37 and three-way valve 29 by the microprocessor may be implemented using a conventional digital-to-analog converter (and if pneumatic control is required, an electrical-to-pneumatic signal transducer). A microprocessor implementing the control functions of pressure controller 57 and valve controller 53 would typically use a control program stored in read only memory (ROM). An algorithm for the first embodiment is represented by the flow chart of FIG. 3.

Figure 3:
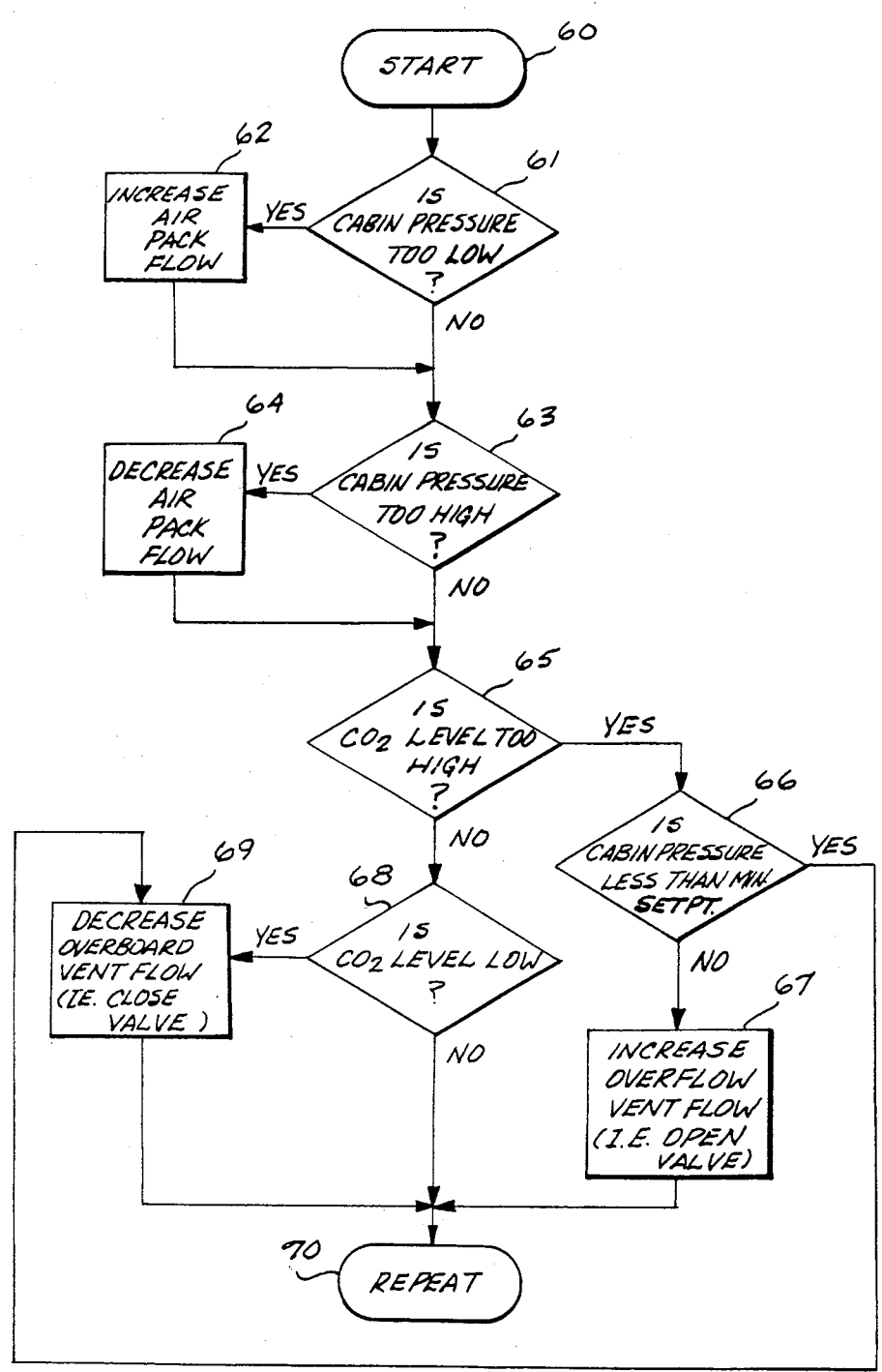
FIG. 3 is a flow chart illustrating an algorithm for control of cabin pressure and carbon dioxide concentration, as implemented by a microprocessor control in a first embodiment of the present invention.

As shown in FIG. 3, the control program initiates at start block 60, and proceeds to block 61 wherein the microprocessor control checks to determine if cabin pressure is below a desired setting. If the pressure is too low, the microprocessor causes the air pack to increase its flow of pressurized fresh air into cabin 11, as indicated in block 62. Thereafter (or if the cabin pressure is not too low), in block 63, the microprocessor control checks to determine if cabin pressure exceeds an upper limit. If the cabin pressure is too high, in block 64, the control causes air pack 37 to decrease the flow of pressurized fresh air into mixing manifold 23. In block 65, the control determines if the carbon dioxide level sensed by sensor 40 (41) is higher than a desirable limit. If the carbon dioxide level does exceed the desired limit, in block 66, the control checks to determine if the cabin pressure is less than a minimum set point. If the pressure is less than the set point, in block 69, the control decreases the flow of air vented overboard by causing three-way valve 29 to recirculate back into cabin 11 more of the air drawn out through exhaust ducts 24 and 25. Otherwise, in block 67, three-way valve 29 is caused to increase the amount of air vented overboard.

Referring back to block 65, if the carbon dioxide level is not too high, the control logic proceeds to block 68 where the control checks to see if the concentration of $CO_2$ is below the desired limit, and if it is, the step previously discussed in block 69 is implemented, i.e., the amount of air being vented overboard is decreased. Otherwise, as indicated in block 70, the algorithm repeats, returning to the start in block 60.

A second embodiment of the present invention is implemented by connecting the carbon dioxide meter 51 to pressure controller 57 by lead 52, so that air pack 37 is more directly used to maintain the concentration of carbon dioxide in cabin 11 within acceptable limits by varying the amount of fresh pressurized air supplied to the cabin. Valve control 53 continues to control three-way valve 29 to vent air overboard, but is not directly connected to carbon dioxide meter 51, and is not directly responsive to the concentration of carbon dioxide in the cabin. Lead 52' is thus omitted in the second embodiment.

Figure 4:
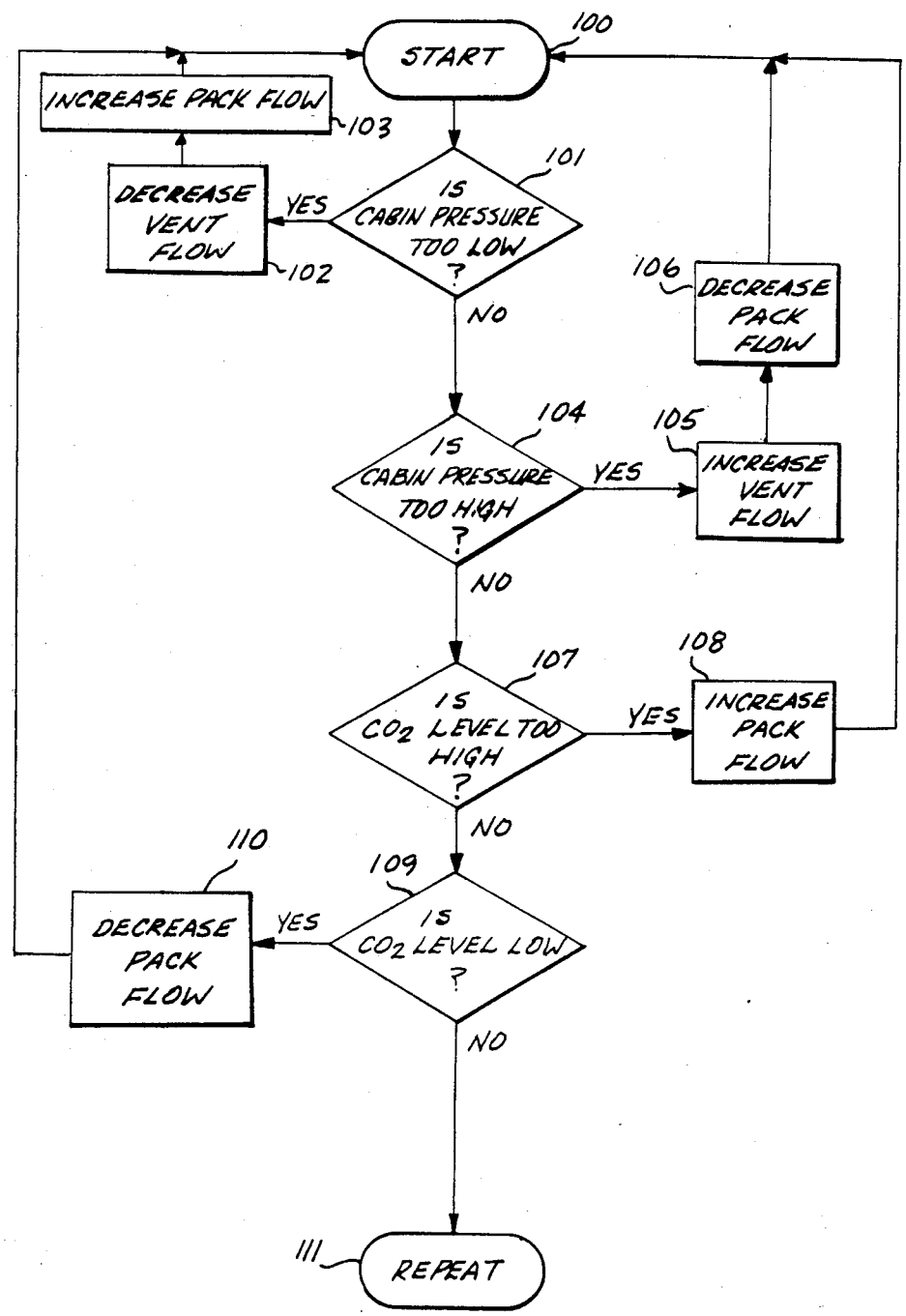
FIG. 4 is a flow chart illustrating an algorithm for control of cabin pressure and carbon dioxide concentration, as implemented by a microprocessor control in a second embodiment of the present invention.

An algorithm for controlling cabin pressure and carbon dioxide concentration in cabin 11 in accord with the second embodiment is illustrated in the flow chart of FIG. 4. Like the first embodiment, it is anticipated that valve control 53 and pressure controller 57 might comprise a conventional microprocessor control including the functional A-D, D-A and memory components already described. A control program for implementing the algorithm as stored in ROM starts at block 100 and continues with block 101, where the control determines if the pressure in cabin 11 is less than a predetermined minimum limit. If the pressure is too low, in block 102, the control causes valve 29 to decrease the volume of air drawn through exhaust ducts 24 and 25 that is being vented overboard, and in block 103, causes air pack 37 to increase the volume of pressurized fresh air that is supplied to cabin 11 by air pack 37. The program then recycles to start, in block 100.

However, if cabin pressure is not too low, in block 104, the algorithm checks to determine if the pressure is greater than a predetermined limit, and if so, in blocks 105 and 106, respectively, increases the volume of air exhausted overboard from the cabin by valve 29, and decreases the volume of pressurized fresh air supplied to the cabin by air pack 37. Again, the program recycles to start, in block 100.

Once the cabin pressure is within the predetermined limits, program logic ascertains if the concentration of carbon dioxide is within predetermined upper and lower limits, in blocks 107 and 109. If the $CO_2$ level is too high, the control causes air pack 37 to increase the flow of pressurized fresh air into the cabin, in block 108, or conversely, if the $CO_2$ level is too low, to decrease the flow of pressurized fresh air into the cabin, in block 110. Following either action, the control recycles to start, as it also does if the level of carbon dioxide concentration is within limits, in block 111.

Although the net result of using the first and the second embodiments is similar, the second embodiment is believed to provide more stable control, particularly should a drastic decrease in cabin pressure occur due to an emergency or seal failure. In both embodiments, the maintenance of cabin pressure at a desired level (or between desired limits) has priority over controlling carbon dioxide concentration at a desired level (or between limits).

The functions of cabin pressure control and control of three-way valve 29 in response to the 0-5 VDC signal from meter 51 as described above in both embodiments are also readily implemented using available discrete electrical and/or mechanical components instead of the microprocessor, as will be apparent to those skilled in the art. Disclosure of the details of valve controller 53 and pressure controller 57 comprising such components is thus unnecessary to enable the present invention to be built and used.

Although the present invention has been disclosed with respect to preferred embodiments and modifications thereto, further modifications will be apparent to those skilled in the art within the scope of the claims which follow hereinbelow.

The embodiments of the invention in which an exclusive property or privilege is claimed are defined as follows:

1. Apparatus for controlling the ventilation of a pressurized enclosed space, comprising:
   (a) a carbon dioxide sensor disposed so as to monitor carbon dioxide concentration in the enclosed space;
   (b) a valve disposed in a fluid path through which air drawn from the space is selectively vented from the space or recirculated back into it;
   (c) air pack means for supplying fresh pressurized air to the space; and
   (d) control means, connected to the carbon dioxide sensor, the pressurization means and the valve, for controlling as a function of the concentration of carbon dioxide in the space one of (i) the volume of pressurized fresh air supplied to the space by the pressurization means, and (ii) the volume of air vented from the space through the valve.

2. The apparatus of claim 1 wherein the control means controls the proportion of the air drawn from the space that is vented through the vale relative to that which is recirculated back into the space as a function of the concentration of carbon dioxide in the space.

3. The apparatus of claim 1 wherein air is drawn from the enclosed space at a first location and a second location, the concentration of carbon dioxide being relatively greater at the first location than at the second.

4. The apparatus of claim 3 further comprising a mixing manifold, wherein the air drawn from the space at the second location is mixed in the mixing manifold with air which has passed through the valve after being drawn from the space at the first location, the mixed air being recirculated back into the space.

5. The apparatus of claim 4 wherein the fresh pressurized air is mixed in the mixing manifold with the air drawn from the space at the first and second locations and the mixed air is recirculated back into the space.

6. The apparatus of claim 5 further comprising a pressure sensor disposed in the enclosed space, wherein the control means comprise pressure control means connected to and responsive to the pressure sensor, for controlling the pressure in the enclosed space at a predetermined level by modulating the flow of the pressurized fresh air into the mixing manifold.

7. The apparatus of claim 6 wherein if the pressure in the enclosed space falls below a preset level, the pressure control means are further operative to reduce the volume of air vented from the space by the valve, irrespective of the concentration of carbon dioxide in the enclosed space.

8. The apparatus of claim 1 wherein the control means are operative to cause the air pack means to (a) increase the volume of pressurized fresh air supplied to the space if the concentration of carbon dioxide exceeds a first predetermined level, and (b) to decrease the volume of pressurized fresh air supplied to the enclosed space if the concentration of carbon dioxide is less than a second predetermined level.

9. The apparatus of claim 8 further comprising a pressure sensor disposed in the enclosed space, wherein the control means comprise pressure control means connected to and responsive to the pressure sensor, for controlling the volume of pressurized fresh air supplied to the space in order to maintain the pressure in the space between predetermined limits, irrespective of the concentration of carbon dioxide in the space.

10. In a system for maintaining a pressurized enclosed space at a desired air pressure, including: means for recirculating back into the enclosed space air drawn from the space at a plurality of locations, the air drawn from at least one or more locations being relatively higher in carbon dioxide concentration than air drawn from one or more other locations; and means for supplying pressurized air that is a mixture of fresh air and recirculated air to the enclosed space to maintain it at a desired pressure, apparatus for controlling the ventilation of the space, comprising:

(a) means for sensing carbon dioxide and for producing a signal indicative of the concentration thereof in the enclosed space;

(b) means connected to receive the signal and responsive thereto, for causing one of (i) a relatively greater volume of air tobe drawn from the one or more locations where the air is relatively higher in carbon dioxide concentration and vented from the space rather than recirculated and mixed into the pressurized supply air, and (ii) the means for supplying pressurized air to supply relatively more fresh air to the space, if the concentration of carbon dioxide indicated by the signal exceeds a predetermined level.

11. The apparatus of claim 10 wherein the means for sensing carbon dioxide include a sensor disposed in a flow path for the mixture of fresh air and recirculated air supplied to the enclosed space.

12. The apparatus of claim 10 wherein the means for sensing carbon dioxide include a sensor disposed adjacent to one of the locations where the air is relatively lower in carbon dioxide concentration.

13. The apparatus of claim 10 wherein the means connected to receive the signal indicative of carbon dioxide concentration are further operative to cause less air to be vented from the enclosed space if the pressure in the enclosed space falls below a preset level.

14. The apparatus of claim 10 wherein the air from the one or more locations that is relatively higher in carbon dioxide concentration and which is recirculated back into the space is mixed with the air from the one or more other locations and with fresh air prior to being supplied to the enclosed space.

15. A method for maintaining an enclosed space at a desired pressure while controlling the concentration of carbon dioxide in a pressurized airstream supplied to the space, the airstream supplied thereto being a mixture of fresh air and of recirculated air drawn from a first and a second location in the space characterized by a relatively higher concentration of carbon dioxide in the first location than in the second, comprising the steps of:

(a) monitoring the concentration of carbon dioxide in the enclosed space;

(b) monitoring the pressure in the enclosed space;

(c) in response to the monitored pressure, increasing the proportion of fresh air in the airstream supplied to the space relative to the recirculated air, to make up for the air vented from the enclosed space; and (d) if the monitored concentration of carbon dioxide in the space exceeds a predetermined level, causing one of (i) more of the air drawn from the first location to be vented outside, and (ii) an increase in the proportion of fresh air in the airstream supplied to the space.

16. The method of claim 15 wherein all of the air drawn from the second location is recirculated back into the space and not vented.

17. The method of claim 15 wherein the concentration of carbon dioxide is monitored by sensing the concentration of carbon dioxide in the pressurized airstream supplied to the space.

18. The method of claim 15 further comprising the step of reducing the volume of air that is vented from the space, if the monitored pressure in the space falls below a preset level, irrespective of the concentration of carbon dioxide in the space.

19. The method of claim 15 wherein relatively more air drawn from the first location is vented as the concentration of carbon dioxide within the enclosed space increases.

20. The method of claim 15 wherein the enclosed space is an aircraft cabin and the first location is disposed above a seating area in the cabin, while the second location is disposed adjacent a floor of the cabin.

21. The method of claim 15 wherein a source of the carbon dioxide comprises a metabolic activity occurring within the enclosed space.

22. The method of claim 15 wherein a source of the carbon dioxide comprises cigarette smoke.

* * * * *